United States Patent [19]

Shirley

[11] 4,067,761
[45] Jan. 10, 1978

[54] PLASTIC WEB SEALING APPARATUS USING HOT AIR HEATED SEALING ROLLER

[75] Inventor: Ronald Clyde Shirley, Bettendorf, Iowa

[73] Assignee: The Kartridg Pak Co., Davenport, Iowa

[21] Appl. No.: 752,136

[22] Filed: Dec. 20, 1976

[51] Int. Cl.² .......................................... B29D 23/10
[52] U.S. Cl. .................................. 156/218; 53/180 M;
 93/20; 93/DIG. 1; 156/459; 156/498; 156/499;
 156/583
[58] Field of Search ............... 156/218, 459, 497, 498,
 156/499, 583; 93/20, DIG. 1; 53/180 M

[56] References Cited

U.S. PATENT DOCUMENTS

| | | | |
|---|---|---|---|
| 1,940,560 | 12/1933 | Moore | 93/20 |
| 2,126,908 | 8/1938 | Moore | 93/20 |
| 2,419,982 | 5/1947 | Zwoyer | 53/180 M |
| 2,831,302 | 4/1958 | Jensen et al. | 53/176 |
| 2,934,130 | 4/1960 | Lane et al. | 53/180 M |
| 3,366,846 | 8/1967 | Berghgracht | 93/20 |

Primary Examiner—Edward G. Whitby
Attorney, Agent, or Firm—Lockwood, Dewey, Zickert & Alex

[57] ABSTRACT

The overlapping edges of a continuously formed tubular configuration of plastic web are fused together between a backup ring and a sealing roller continuously heated by hot air directed against the periphery of the roller. When the heated roller is pressed in sealing engagement against the overlapped edges of the moving film it is rotated due to the frictional engagement of the roller with the film. A portion of the hot air impinges on blades extending laterally from opposite sides of the roller to apply torque thereto and thereby keep the roller spinning whenever the roller is out of frictional engagement with the overlapped edges of the continuously advancing web. By keeping the roller spinning it is evenly heated and hot spots are not allowed to develop as they would if the roller stopped while hot air continued to impinge on it. Cooling air is applied to the sealed overlapping edges after the sealing operation has been performed.

6 Claims, 6 Drawing Figures

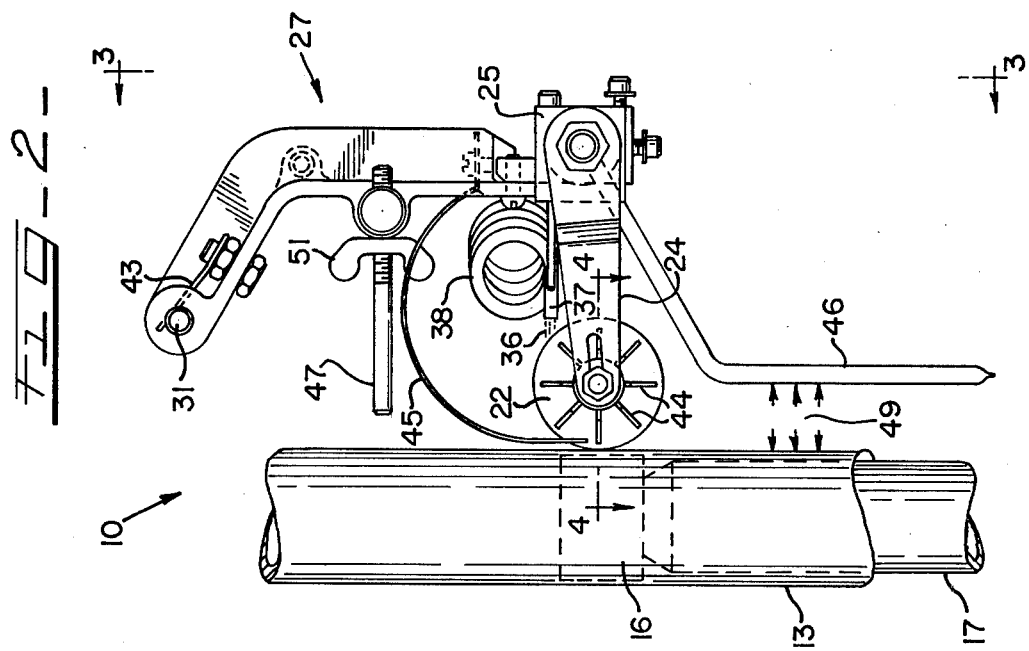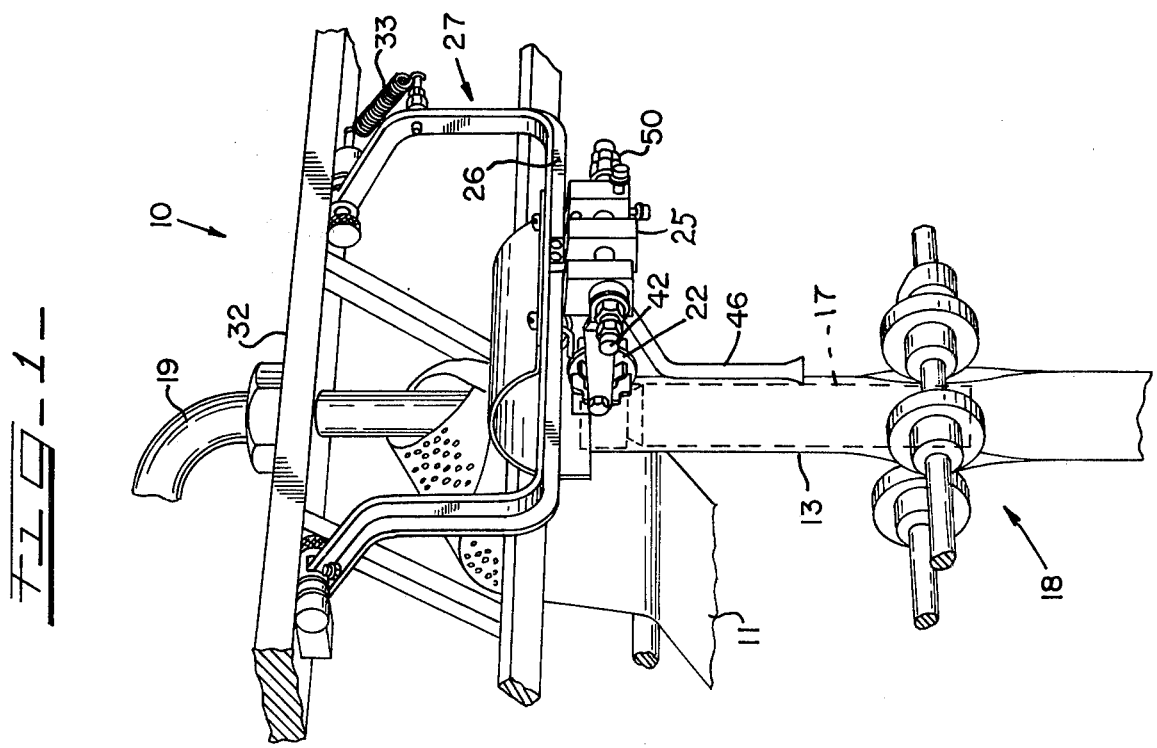

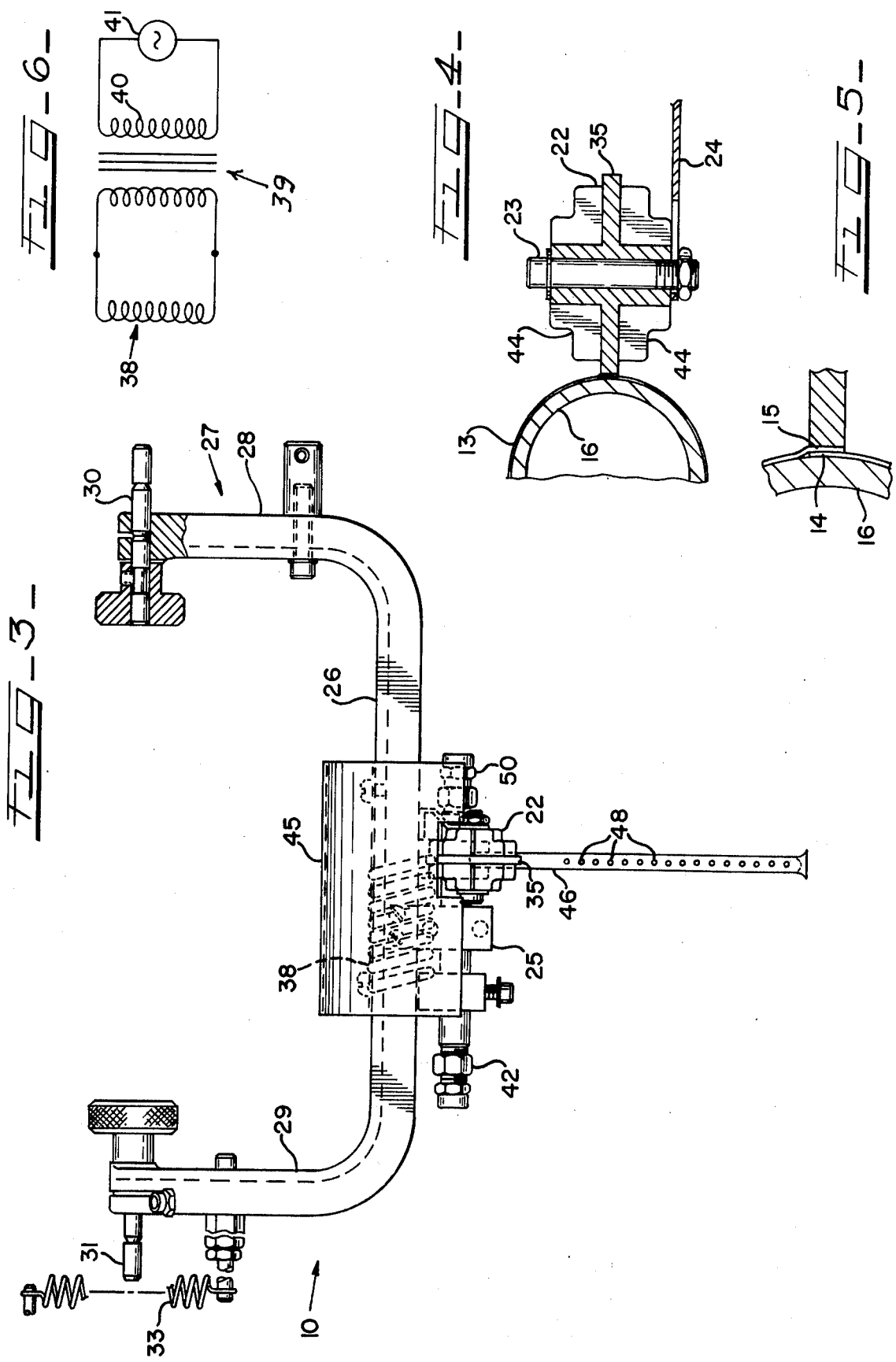

PLASTIC WEB SEALING APPARATUS USING HOT AIR HEATED SEALING ROLLER

This invention relates, generally, to means for sealing the overlapping edges of a continuously formed tubular configuration in a so-called Chub machine and it relates particularly to the use of a hot air heated roller therefor. It constitutes an improvement over the packaging machine disclosed in U.S. Pat. No. 2,831,302, issued Apr. 22, 1958. Such machines have been in commercial use for a number of years being known as Chub machines and manufactured by The Kartridg Pak Co. of Davenport, Iowa.

The invention is particularly useful in heat sealing the overlapping edges of certain types of film on a Chub machine which films are difficult to seal with presently available equipment or attachments. Representative of such films is heat sealable shrink film which is a laminate having a thickness of over three mils. The equipment and method provided by the present invention enables such a film to be heat sealed on a Chub machine without wrinkling in the seal area. Better heat transfer through the outer film is provided which is important in using relatively heavy films. Since the sealing roller is spring loaded in pressing the overlapped edges of the film against the sealing ring, the edges are pressed more firmly together than with direct hot air sealing. Further, since the sealing roller is heated by a stream of hot air, no electrical commutation is required in the roller.

Among the objects of this invention are in a Chub machine: to employ a roller heated by hot air impinging thereon for fusing together the overlapping edges of a tube continuously formed from a web of heat sealable plastic film; to heat the air while it flows through a coil of tubular heat conducting material acting as a resistance heater; to apply torque to the heated roller when it is not driven by frictional engagement with the overlapping edges by directing a portion of the hot air stream to impinge upon blades extending laterally from opposite sides of the roller thereby keeping it spinning and thus evenly heated without development of hot spots; and to apply cooling air to the fused overlapping edges.

In the drawings:

FIG. 1 is a fragmentary perspective view of a heat sealing attachment or unit which this invention is embodied and adapted to be used on a package forming machine of the type disclosed in the patent above referred to and known in the art as a Chub machine;

FIG. 2 is an elevational view looking from left to right of the sealing apparatus shown in FIG. 1;

FIG. 3 is a rear elevational view taken on line 3—3 of FIG. 2;

FIG. 4 is a detail horizontal sectional view on enlarged scale taken generally along line 4—4 of FIG. 2; and FIG. 5 is a magnified detail view showing the overlapped edges of the film being pressed together in forming the continuous seal therebetween;

FIG. 6 shows diagrammatically the circuit for energizing the heating coil for the hot air supply.

Referring now to FIGS. 1, 2 and 3 of the drawings, reference character 10 designates generally sealing apparatus embodying the present invention for use in a Chub machine of the kind and character disclosed in the above-identified U.S. Pat. No. 2,831,302. The apparatus is employed for sealing together the edges of a web 11 of heat sealable plastic sheet material which is fed over a curved-forming plate to provide a tubular configuration 13 having overlapping edges 14 and 15 shown more clearly in FIG. 4. The tubular configuration is pulled down in known manner over a backup or sealing ring 16 formed of a heat resistant insulating material having a low coefficient of friction such as Teflon. The tube is then drawn down over the discharge end of a filling mandrel 17 by feed rollers indicated generally at 18, in accordance with the disclosure of the above patent. The backup ring 16 is mounted on the filling mandrel 17. A supply conduit 19 is arranged to cause a pumpable product, such as sausage emulsion, cheese or dough, or non-food products such as resins, to be delivered to the filling mandrel 17 and discharged into the tubular configuration 13. The overlapping edges 14 and 15 (FIG. 4) are sealed as they pass over and are pressed against the internal backup ring 16 in accordance with this invention.

As shown in the drawings, a roller 22 formed of Teflon or other suitable non-sticking material having a width about the same as the overlapped portions 14 and 15 bears against them as they are supported by the backup ring 16.

The sealing roller is rotatably mounted on a stub shaft 23 that is carried at the outer end of an arm 24 which is rigidly mounted on an air supply bracket 25. The air supply bracket 25 is rigidly mounted on the elongated horizontal central section 26 of a U-shaped frame or yoke that is indicated, generally at 27. The frame 27 has arms 28 and 29 the distal ends of which are pivoted on pins 30 and 31 mounted on the underside of a support member 32. The wire spring 43 acts as a detent in a groove in pin 31 to retain the pivot pin that pivotally supports the frame 27. A coil tension spring 33 interconnects the underside of the support 32 and an intermediate point on the arm 29 as shown more clearly in FIG. 1. It will be understood that the coil tension spring 33 biases the roller 22 into engagement with the outer overlapping edge 15 of the tubular configuration 13 as it is drawn down over the backup ring 16.

It has been found that a wrinkle-free heat seal is continuously formed between the overlapping edges 14 and 15 when the periphery 35 of the roller 22 is suitably heated. For this purpose, as shown in FIG. 2, a stream 36 of hot air from a nozzle 37 is directed against the periphery 35 of the roller 22 to uniformly heat the same to the necessary temperature for effecting the heat seal between the overlapping edges 14 and 15.

The nozzle 37 is located at one end of a coil 38 of tubular conducting material. For heating the air passing through it, the coil ends are connected to a transformer 39 that is shown diagrammatically in FIG. 6. The primary winding 40 is arranged to be energized from a suitable source 41, e.g. 50/60Hz. The voltage may be variable by use of an auto-transformer to control the primary voltage from 0 to 115 VAC while the secondary voltage is varied between 0 to 16 VAC. An external connection for supplying air to be heated through the coil 38 is indicated at 42 in FIGS. 1 and 3.

It is desirable that the roller 22 continue to spin or rotate even though not in frictional rotation-producing engagement with the tubular configuration 13, or more particularly the overlapping edges 14 and 15 thereof. The reason for keeping the roller 22 spinning is to avoid the development of a hot spot such as would develop if the roller 22 were allowed to come to a stop. For this purpose laterally extending blades 44 are provided on opposite sides of the roller 22 as illustrated more clearly in FIG. 4. Part of the blast 36 of hot air from the coil 38 reacts against the laterally extending blades 44 and causes the roller 22 to spin. The torque thus produced is sufficient to keep the roller 22 spinning when it is not in engagement with the overlapped edges.

A curved heat shield 45 of suitable material overlies the roller 22 and the coil 38 of tubular conducting material to confine the heat generated to this vicinity.

After the edges 14 and 15 have been fused or heat sealed, it is desirable to cool them and the fused seal therebetween. For this purpose there is provided a tube 46 which extends from the air supply bracket 25. As shown in FIGS. 2 and 3, the tube 46 is provided with a series of openings from which jets of cooling air can flow as inidicated at 49. The cooling air can be supplied through a connection 50.

It will be apparent that the overlapping edges 14 and 15 of the tubular configuration 13 are fused or heat sealed upstream from where product is discharged from the filling mandrel 17. Due to the combination of heat and pressure applied by the roller 22 to the overlapped edges 14 and 15 of the film a continuous wrinkle-free seal is formed therebetween even with relatively heavy laminated films. Teflon alone or Teflon filled with fiber glass may be used to form the roller 22. However, other materials including plastics and metals may be used provided they are able to resist the heating required for sealing and not adhere to the film being sealed.

If desired an adjustable screw 47 and wing nut 51 may be used to provide a mechanical stop to limit the pressure exerted on the film passing between the roller rim 35 and the backup ring 16. In certain instances excess pressure on the film may cause either wrinkles in the seal or cuts in the film.

For a given type and thickness of film 11 a suitable range of heat sealing conditions can be readily determined the variables in the apparatus 10 being the temperature, volume and temperature of the air impinging on the roller 22, the pressure of the film-engaging roller periphery 35 against the overlapping edges 14 and 15, and the rate of film travel. A suitable set of conditions can be readily established for a given type and thickness of film which will produce a strong wrinkle-free heat seal between the overlapping edges 14 and 15. Generally, satisfactory seal-forming conditions fall within the following ranges:

volume of heated air; 5 to 8 std. cubic feet/sec.
temperature of heated air; 300°-650° F.
pressure roller force; 8 oz. - 2 lbs.
rate of film travel; 200 to 600 in./min.

I claim:

1. In a machine for forming a tube from a web of heat sealable material and continuously advancing the same, in combination, means for forming said web into a tubular configuration with the longitudinal edges in overlapping tube wall-forming engagement, rigid backup means over which the tubular web is movable continuously, a free-turning sealing roller mounted for frictional rotation-producing engagement with the outer of said overlapping edges opposite said backup means and for yieldably applying predetermined sealing pressure thereto, means for heating said roller to a temperature high enough to seal said overlapping edges together, said means for heating said roller comprising means to direct a stream of heated air under pressure against said sealing roller to heat the same to operating temperature and said sealing roller having laterally extending blades disposed in the path of said stream of heated air so as to keep said roller spinning when the same is not in frictional engagement with said continuously advancing web.

2. In a machine according to claim 1 wherein said heated air is supplied through a coil of tubular conducting material electrically connected to the secondary winding of a transformer.

3. In a machine according to claim 1 wherein means are arranged to apply cooling air to the sealed overlapping edges after the heat sealing operation has been performed.

4. In a machine for forming a tube from a web of heat sealable material and continuously advancing the same, in combination, means for forming said web into a tubular configuration with the longitudinal edges in tube wall-forming overlapping engagement, rigid backup means over which the tubular web is movable continuously, a free-turning sealing roller, means for movably mounting said roller for either frictional rotation-producing engagement with the outer of said overlapping edges opposite said backup means and applying sealing pressure thereto or for non-engagement with the outer overlapping edge, means for tangentially directing a stream of heated air against the web-engaging peripheral surface of said sealing roller to heat the same to sealing temperature and, means for rotating said roller when not engaging said outer overlapping edge.

5. In a machine according to claim 4 wherein the web-engaging peripheral surface of said roller has a width approximately equal to the distance by which said longitudinal edges overlap, and said roller has blades laterally extending from opposite sides disposed at least partially in the path of said heated air so as to rotate said roller when the same is not engaging the outer of said overlapping edges.

6. In the method of forming from a flat web of heat sealable film a tube with a wrinke-free seam wherein the web is continuously withdrawn from a supply roll, the lateral edges continuously brought into overlapping seam-forming relationship over a backup ring and the continuous tube is continuously pulled over the backup ring, the improvement which comprises, pressing the periphery of a free-turning roller having laterally extending fins against the overlapping lateral edges of film at a location opposite said backup ring, and directing a stream of heated air against said roller periphery and at least in part against said fins, said stream of heated air serving to heat said roller periphery to a predetermined temperature film-sealing temperature and to spin said roller at such times as said roller periphery is not in friction driving relationship with said overlapping lateral edges.

* * * * *